US008181002B1

(12) United States Patent  (10) Patent No.: US 8,181,002 B1
Yip et al.  (45) Date of Patent: May 15, 2012

(54) MERGING CHECKPOINTS IN AN EXECUTE-AHEAD PROCESSOR

(75) Inventors: Sherman H. Yip, San Francisco, CA (US); Paul Caprioli, Santa Clara, CA (US); Marc Tremblay, Menlo Park, CA (US)

(73) Assignee: Oracle America, Inc., Redwood Shores, CA (US)

( * ) Notice: Subject to any disclaimer, the term of this patent is extended or adjusted under 35 U.S.C. 154(b) by 340 days.

(21) Appl. No.: 11/655,655

(22) Filed: Jan. 18, 2007

(51) Int. Cl.
    *G06F 7/00* (2006.01)
(52) U.S. Cl. .......................................... 712/220; 712/228
(58) Field of Classification Search .................... 712/220
    See application file for complete search history.

(56) References Cited

U.S. PATENT DOCUMENTS

| 2004/0230778 A1* | 11/2004 | Chou et al. ..................... 712/228 |
| 2006/0085679 A1* | 4/2006 | Neary et al. ..................... 714/13 |
| 2006/0212688 A1* | 9/2006 | Chaudhry et al. ............. 712/228 |

* cited by examiner

*Primary Examiner* — Eddie P Chan
*Assistant Examiner* — John Lindlof
(74) *Attorney, Agent, or Firm* — Park, Vaughan, Fleming & Dowler LLP; Anthony Jones

(57) ABSTRACT

One embodiment of the present invention provides a system that merges checkpoints on a processor. The system starts by executing instructions speculatively during a speculative-execution episode. The system then generates a first checkpoint and a second checkpoint during the speculative-execution episode. Next, the system merges the first checkpoint with the second checkpoint during the speculative-execution episode, wherein merging the first and second checkpoints conserves processor resources.

17 Claims, 4 Drawing Sheets

MERGING CHECKPOINTS IN AN EXECUTE-AHEAD PROCESSOR

RELATED APPLICATION

The subject matter of this application is related to the subject matter in a co-pending non-provisional application by the same inventors as the instant application entitled, "The Generation of Multiple Checkpoints in a Processor that Supports Speculative Execution," having Ser. No. 11/084,655, and filing date 18 Mar. 2005.

BACKGROUND

1. Field of the Invention

The present invention relates to techniques for improving the performance of computer systems. More specifically, the present invention relates to a method and apparatus for merging checkpoints in a processor that supports speculative-execution.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load generates a cache miss, the subsequent access to level-two (L2) cache or memory can require dozens or hundreds of clock cycles to complete, during which time the processor is typically stalled (and therefore idle), performing no useful work.

A number of forms of "speculative execution" have been proposed or are presently used to prevent the processor from stalling when a cache miss occurs. For example, some processor designers have proposed generating a checkpoint and entering a "scout mode" during processor stall conditions. In scout mode, instructions are speculatively executed to prefetch future loads and stores, but results are not committed to the architectural state of the processor. For example, see U.S. patent application Ser. No. 10/741,944, filed 19 Dec. 2003, entitled, "Generating Prefetches by Speculatively Executing Code through Hardware Scout Threading," by inventors Shailender Chaudhry and Marc Tremblay. The scout mode technique allows a processor to perform computations during stall conditions which enables the processor to prefetch future loads and stores. However, the scout mode technique suffers from the disadvantage of having to re-compute results of computational operations that were performed during scout mode.

To avoid performing some of these re-computations, processor designers have proposed entering an "execute-ahead" mode when the processor encounters a data-dependent stall condition. In execute-ahead mode, the processor defers instructions that cannot be executed because of unresolved data dependencies and executes other non-deferred instructions in program order.

When a data dependency is ultimately resolved, the processor transitions to a "deferred mode" to execute the deferred instructions. In deferred mode, the processor executes deferred instructions that are able to be executed while re-deferring deferred instructions that still cannot be executed because of unresolved data dependencies. For example, see U.S. Pat. No. 7,114,060, filed 14 Oct. 2003, entitled, "Selectively Deferring the Execution of Instructions with Unresolved Data Dependencies as They Are Issued in Program Order," by inventors Shailender Chaudhry and Marc Tremblay.

By allowing a processor to continue to perform work during processor stall conditions, the above-described speculative-execution techniques can significantly increase the amount of computational work the processor completes.

Unfortunately, the computational work performed during execute-ahead mode can be lost when the processor encounters a condition which requires the processor to return to a previous checkpoint. Because thousands of instructions can be executed during execute-ahead mode, the lost computational work can significantly reduce processor performance.

In order to avoid losing this computational work, some processor designers have proposed using multiple checkpoints to avoid returning to a remote checkpoint. For a more detailed explanation of setting multiple checkpoints see pending U.S. patent application "The Generation of Multiple Checkpoints in a Processor that Supports Speculative Execution," by inventors Shailender Chaudhry, Marc Tremblay, and Paul Caprioli, having Ser. No. 11/084,655, and filing date 18 Mar. 2005. In such a system, a processor can generate additional checkpoints when it encounters certain conditions. For example, the processor can generate an additional checkpoint if the processor encounters: an independent load miss; a predicted branch instruction with an unresolvable data dependency; a memory barrier or atomic instruction; or if the number of instructions executed since the previous checkpoint reaches a predetermined number. The processor then returns to the more-recently generated checkpoint instead of returning to the remote checkpoint, which minimizes the redoing of computational work.

Unfortunately, the number of checkpoints that a system can support is limited by practical considerations, such as processor area constraints. Hence, even processors that support multiple checkpoints cannot support a large number of checkpoints. Consequently, at runtime a processor can allocate all available checkpoints and then cannot allocate additional checkpoints, which can adversely affect the performance of the processor.

Hence, what is needed is a processor that supports multiple checkpoints without the above-described problem.

SUMMARY

One embodiment of the present invention provides a system that merges checkpoints on a processor. The system starts by executing instructions speculatively during a speculative-execution episode. The system then generates a first checkpoint and a second checkpoint during the speculative-execution episode. Next, the system merges the first checkpoint with the second checkpoint during the speculative-execution episode, wherein merging the first and second checkpoints conserves processor resources.

In a variation on this embodiment, during the speculative-execution episode, the processor operates in either: (1) an execute-ahead mode, wherein instructions that cannot be executed because of an unresolved data dependency are deferred, and wherein other non-deferred instructions are executed in program order; or (2) a deferred mode wherein deferred instructions are executed in program order, and wherein deferred instructions that still cannot be executed because of unresolved data dependencies are deferred again.

In a variation on this embodiment, generating a checkpoint involves saving architectural state information from the processor to facilitate subsequent recovery from exceptions that arise during execute-ahead mode or deferred mode.

In a variation on this embodiment, a checkpoint is generated when the processor encounters: (1) an independent load miss; (2) an unresolvable data-dependent predicted branch; (3) a memory barrier instruction; or (4) an atomic instruction.

In a variation on this embodiment, when merging checkpoints, the system combines state information from a first checkpoint with state information from a second checkpoint to create a single replacement checkpoint.

In a variation on this embodiment, when combining the state information from the first checkpoint with the state information from the second checkpoint, the system copies data from the first checkpoint to the second checkpoint unless the second checkpoint has more recent data.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments of the present invention provide a system for merging checkpoints in a processor that supports multiple checkpoints. For example, if the system is currently maintaining N checkpoints and an event occurs for which the system would normally generate an N+1st checkpoint, the system can instead merge two neighboring checkpoints to free up the Nth checkpoint for the event. We discuss the process of merging checkpoints in more detail in the following sections.

Although the discussion in the following sections relates to merging two neighboring checkpoints, alternative embodiments can merge more than two checkpoints using the same principles.

Processor

Figure 1:
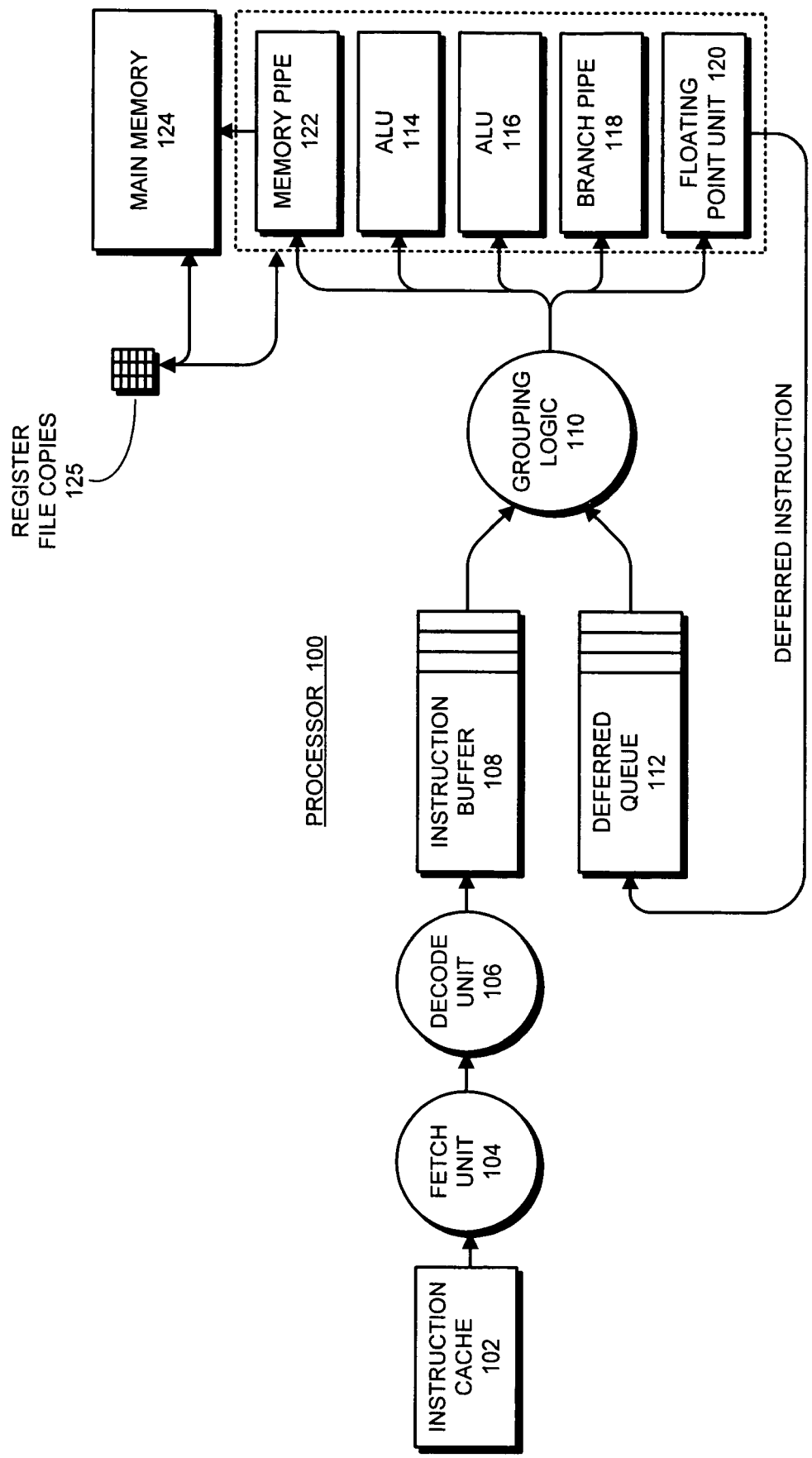
FIG. 1 illustrates the design of a processor that supports speculative-execution in accordance with an embodiment of the present invention.

FIG. 1 illustrates the design of a processor 100 that supports speculative-execution in accordance with an embodiment of the present invention. Processor 100 can generally include any type of processor, including, but not limited to, a microprocessor, a mainframe computer, a digital signal processor, a personal organizer, a device controller, and a computational engine within an appliance. As is illustrated in FIG. 1, processor 100 includes: instruction cache 102, fetch unit 104, decode unit 106, instruction buffer 108, deferred queue 112, grouping logic 110, main memory 124, arithmetic logic unit (ALU) 114, ALU 116, branch pipe 118, memory pipe 122, and floating point unit 120.

Deferred queue 112 is organized as a FIFO buffer. In addition, in order to support multiple checkpoints, deferred queue 112 includes a number of "deferred queue indicators," one for each checkpoint supported by processor 100. A deferred queue indicator specifies the location of the last instruction deferred to deferred queue 112 before the corresponding checkpoint was generated. A deferred queue indicator can be used to prevent processor 100 from executing deferred instructions that were deferred following a specific checkpoint.

Processor 100 also includes register file copies 125. Register file copies 125 include a number of copies of processor 100's register file which, for example, can include one copy for the architectural state of each register, and one copy for each checkpoint processor 100 supported by processor 100. The latter copies hold the values which are speculatively written to the register file following the generation of a checkpoint. If speculative execution is successful, the speculative results written to these registers during speculative execution can become the processor's architectural values.

Each register in register file copies 125 is associated with a "not-there" (NT) bit. The system uses not-there bits to keep track of whether a valid data value is contained in the corresponding register. For example, if an instruction is waiting for a source operand to be produced by a load miss, the instruction is deferred and the not-there bit of the instruction's destination register is set to indicate that the desired result is not present in the destination register. When a subsequent instruction accesses a source operand value that is marked as not-there, the system marks the subsequent instruction's destination register as not-there to indicate that the value in the destination register depends on the unresolved data-dependency.

During operation, fetch unit 104 retrieves instructions to be executed from instruction cache 102, and feeds these instructions into decode unit 106. Decode unit 106 forwards the instructions to be executed into instruction buffer 108, which is organized as a FIFO buffer. Instruction buffer 108 feeds instructions in program order into grouping logic 110, which groups instructions together and sends them to execution units, including memory pipe 122 (for accessing memory 124), ALU 114, ALU 116, branch pipe 118 (which resolves conditional branch computations), and floating point unit 120.

If an instruction cannot be executed due to an unresolved data dependency, such as an operand that has not returned from a load operation, the system defers execution of the instruction, sets the not-there bit of the destination register, and moves the instruction into deferred queue 112 along with a copy of the operands that are available for the instruction.

When the data dependency is eventually resolved, instructions from deferred queue 112 are executed in program order with respect to other deferred instructions, but not with respect to other previously executed non-deferred instructions.

Speculative-Execution State Diagram

Figure 2:
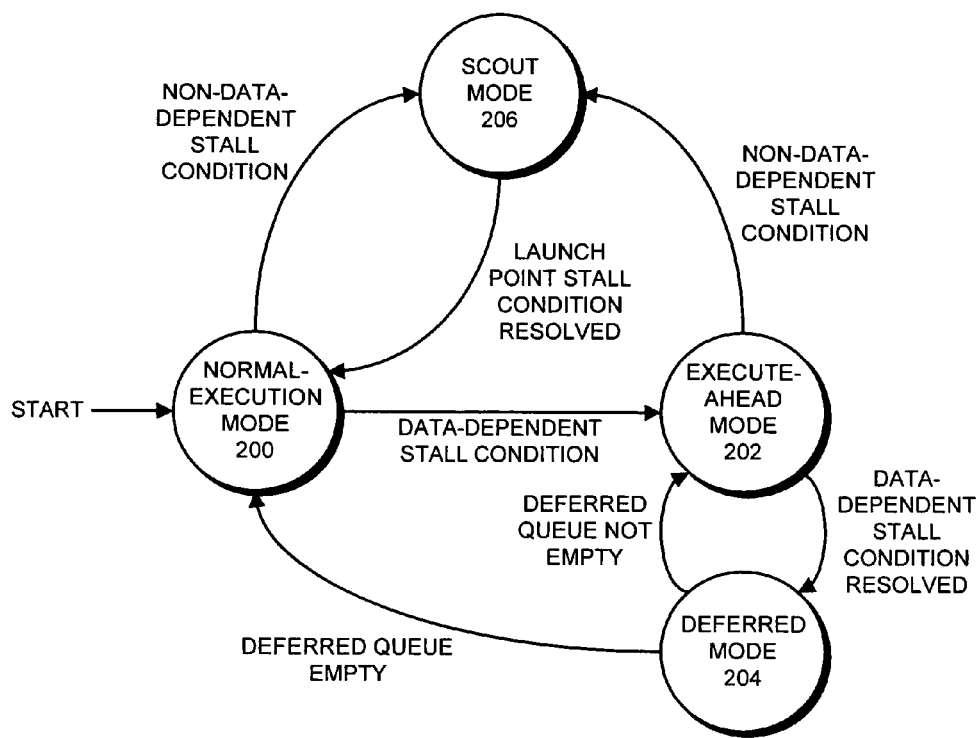
FIG. 2 presents a state diagram which includes a general depiction of execute-ahead mode, scout mode, and deferred mode in accordance with an embodiment of the present invention.

FIG. 2 presents a state diagram which includes execute-ahead mode 202, deferred mode 204, and scout mode 206 in accordance with an embodiment of the present invention. The system starts in normal-execution mode 200, wherein instructions are executed in program order as they are issued from instruction buffer 108 (see FIG. 1).

Next, if an unresolved data dependency arises during execution of an instruction, the system moves to execute-ahead mode 202. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 202, the system generates a checkpoint that can be used, if necessary, to return execution of the process to the point where the unresolved data dependency was encountered; this point is referred to as the "launch point." (Generating the checkpoint involves saving the precise architectural state of processor 100 to facilitate subsequent recovery from exceptions that arise during execute-ahead mode 202 or deferred mode 204.) The system also "defers" execution of the instruction that encountered the unresolved data dependency by storing the instruction in deferred queue 112.

While operating in execute-ahead mode 202, the system continues to execute instructions in program order as they are received from instruction buffer 108; any instructions that cannot execute because of an unresolved data dependency are deferred into deferred queue 112.

During execute-ahead mode 202, if an unresolved data dependency is finally resolved, the system moves into deferred mode 204, wherein the system attempts to execute instructions from deferred queue 112 in program order. Note that the system attempts to execute these instructions in program order with respect to other deferred instructions in deferred queue 112, but not with respect to other previously executed non-deferred instructions (and not with respect to deferred instructions executed in previous passes through deferred queue 112). During this process, the system defers execution of deferred instructions that still cannot be executed because of unresolved data dependencies by placing these again-deferred instructions back into deferred queue 112 (i.e., re-deferring the instructions). On the other hand, the system executes other instructions that can be executed in program order with respect to each other.

After the system completes a pass through deferred queue 112, if deferred queue 112 is empty, the system moves back into normal-execution mode 200. This involves performing a "join" operation to commit changes made during execute-ahead mode 202 and deferred mode 204 to the architectural state of processor 100, if such changes have not been already committed. Moving back into normal-execution mode 200 can also involve discarding the checkpoint generated when the system moved into execute-ahead mode 202.

On the other hand, if deferred queue 112 is not empty after the system completes a pass through deferred queue 112, the system returns to execute-ahead mode 202 to execute instructions from instruction buffer 108 from the point where the execute-ahead mode 202 left off.

If a non-data dependent stall condition arises while the system is in normal-execution mode 200 or in execute-ahead mode 202, the system moves into scout mode 206. For example, this non-data-dependent stall condition can include a memory barrier operation, or a deferred queue full condition. In scout mode 206, instructions are speculatively executed to prefetch future memory operations, but results are not committed to the architectural state of processor 100. Scout mode 206 is described in more detail in a pending U.S. patent application entitled, "Generating Prefetches by Speculatively Executing Code Through Hardware Scout Threading," by inventors Shailender Chaudhry and Marc Tremblay, having Ser. No. 10/741,944, and filing date 19 Dec. 2003, which is hereby incorporated by reference to describe implementation details of scout mode 206.

Unfortunately, computational operations performed during scout mode 206 need to be recomputed again, which can require a large amount of computational work.

When the original "launch point" stall condition is finally resolved, the system moves back into normal-execution mode 200, and, in doing so, uses the previously generated checkpoint to resume execution from the launch point instruction that encountered the launch point stall condition. The launch point stall condition is the stall condition that originally caused the system to move out of normal-execution mode 200. For example, the launch point stall condition can be the data-dependent stall condition that caused the system to move from normal-execution mode 200 to execute-ahead mode 202, before moving to scout mode 206. Alternatively, the launch point stall condition can be the non-data-dependent stall condition that caused the system to move directly from normal-execution mode 200 to scout mode 206.

Merging Checkpoints

Figure 3:
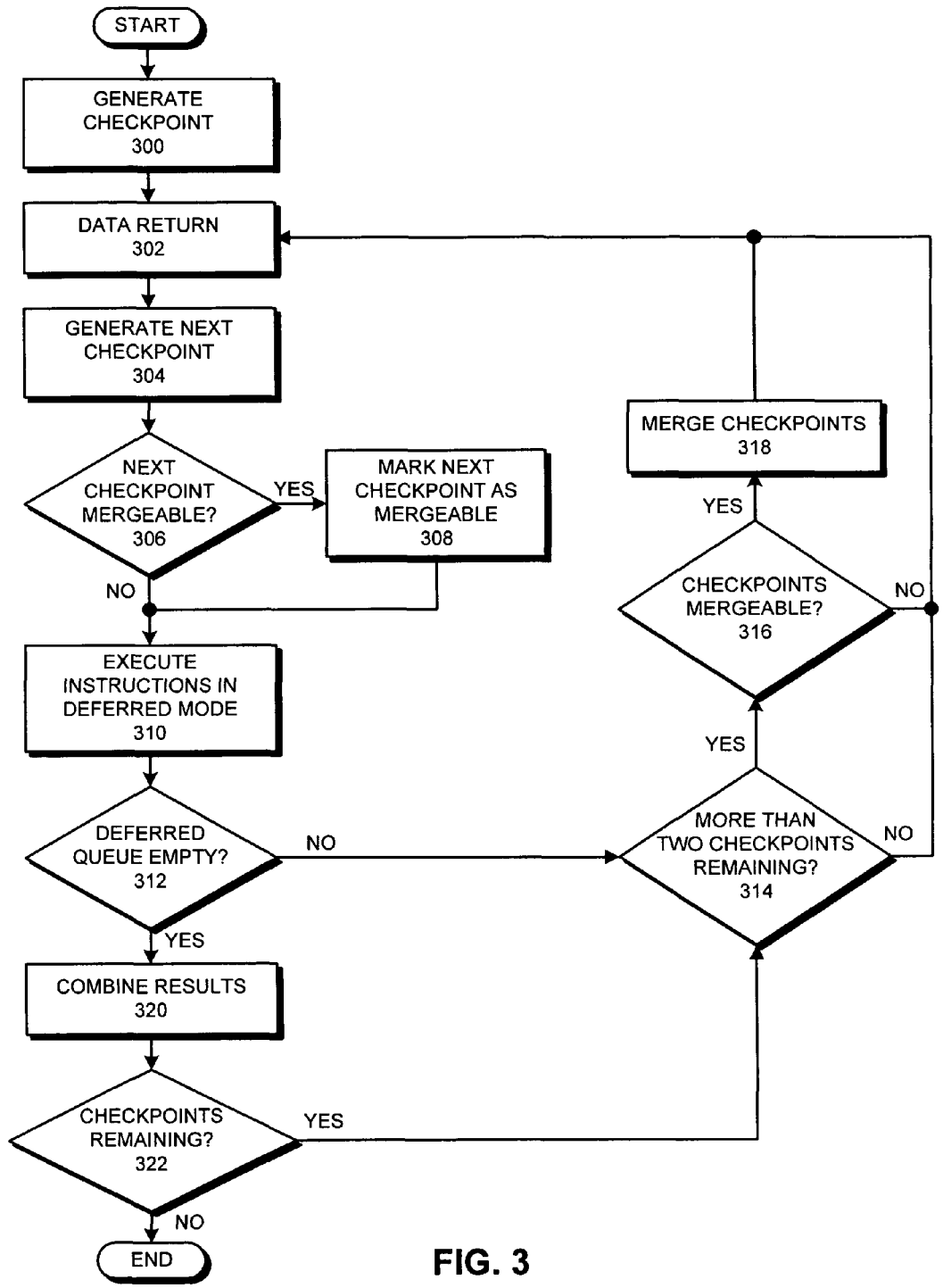
FIG. 3 presents a flow chart illustrating the process of merging checkpoints in accordance with an embodiment of the present invention.

FIG. 3 presents a flow chart illustrating the process of merging checkpoints in accordance with an embodiment of the present invention. The process starts with a processor operating in execute-ahead mode 202. Because the processor is already operating in execute-ahead mode 202, processor 100 may have previously set multiple checkpoints. For a more detailed explanation of setting multiple checkpoints see pending U.S. patent application entitled, "The Generation of Multiple Checkpoints in a Processor that Supports Speculative Execution," by inventors Shailender Chaudhry, Marc Tremblay, and Paul Caprioli, having Ser. No. 11/084,655, and filing date 18 Mar. 2005, which is hereby incorporated by reference to describe implementation details of setting multiple checkpoints.

While operating in execute-ahead mode 202, processor 100 encounters an event which causes processor 100 to generate a checkpoint (step 300). There are a number of events which can cause the processor to generate a checkpoint. For example, processor 100 can generate a checkpoint upon encountering a program location that the processor is likely to return to, or when a potential return to a previous checkpoint becomes too costly (i.e., a large quantity of computational work may be lost). For example, checkpoints may be generated after encountering: (1) an independent load miss; (2) a predicted branch instruction with an unresolved data dependency; (3) a memory barrier or atomic instruction; or (4) a program location where the number of instructions executed since the previous checkpoint equals a predetermined value.

As processor 100 continues to operate in execute-ahead mode 202, suppose data returns for a deferred instruction (step 302). In order to protect the work done up to this point in execute-ahead mode 202, processor 100 generates another checkpoint (step 304).

Processor 100 then determines if the checkpoint is "mergeable" (step 306). Note that merging checkpoints involves combining the incremental architectural state of processor 100 saved in neighboring checkpoints into a single replacement checkpoint. Therefore, a checkpoint is mergeable if the checkpoint can be combined with a neighboring checkpoint.

The determination of whether a checkpoint is mergeable involves considering the potential adverse affects of merging the checkpoint. Some categories of checkpoints are rarely marked as mergeable, while other categories are more routinely marked as mergeable. For example, a data-return checkpoint, particularly in the situation where there are only a few instructions executed between the last generated checkpoint and the data return, is the type of checkpoint that is routinely marked as mergeable. On the other hand, some speculative execution processors support only one divide instruction at a time. If a second divide instruction is encountered while the first divide instruction is being executed, the second divide instruction is deferred and the processor generates a checkpoint. This type of checkpoint is almost never marked as mergeable.

If the checkpoint is mergeable, processor 100 sets an indicator that marks the checkpoint as mergeable (step 308).

Processor 100 then commences execution in deferred mode 204 (step 310). After making a pass through deferred queue 112 in deferred mode 204, processor 100 determines if any instructions remain in the deferred queue before the deferred queue indicator (step 312). If so, processor 100 determines if there are two or more checkpoints remaining (step 314). If there are two or more checkpoints remaining, processor 100 determines if the checkpoints are mergeable (step 316). If so, processor 100 merges the checkpoints (step 318). Processor 100 then returns to step 302 to await a data return.

In one embodiment of the present invention, merging checkpoints involves combining both the data stored in the register file copies associated with the checkpoints and the not-there bits corresponding to the register file copies. When the data and the not-there bits are combined, the most recently written data and not-there bits are retained in the replacement checkpoint. For example, if a result was written to a register following a first checkpoint, but was not written following a second checkpoint, the result from the first checkpoint is used in the replacement checkpoint. Alternatively, if a result was written to a register following the second checkpoint, that result is used in the replacement checkpoint, regardless of whether the result was written to a register following the first checkpoint.

Otherwise, if no instructions remain in the deferred queue before the deferred queue indicator, processor 100 combines the results of execution in deferred mode 204 with the results calculated in execute-ahead mode 202 (step 320). Processor 100 then determines if there are any checkpoints remaining (step 322). If not, the processor has completed speculative-execution and can return to normal-execution mode 200.

On the other hand, if there are checkpoints remaining (step 322), processor 100 determines if there are two or more checkpoints remaining (step 314). If there are two or more checkpoints remaining, processor 100 determines if the checkpoints are mergeable (step 316). If so, processor 100 merges the checkpoints (step 318). Note that merging occurs when the processor has just completed execution in deferred mode 204. This ensures that the checkpoints are in a "steady state" and are therefore safe to merge.

If the checkpoints are not mergeable, processor 100 returns to step 302 to await a data return (or to await the removal of any remaining checkpoint, based on a non-data-returning operation).

Otherwise, if there is only one checkpoint remaining, processor 100 returns to step 302 to await a data return (or to await the removal of any remaining checkpoint based on a non-data-returning operation).

Branch Instruction Example

Figure 4:
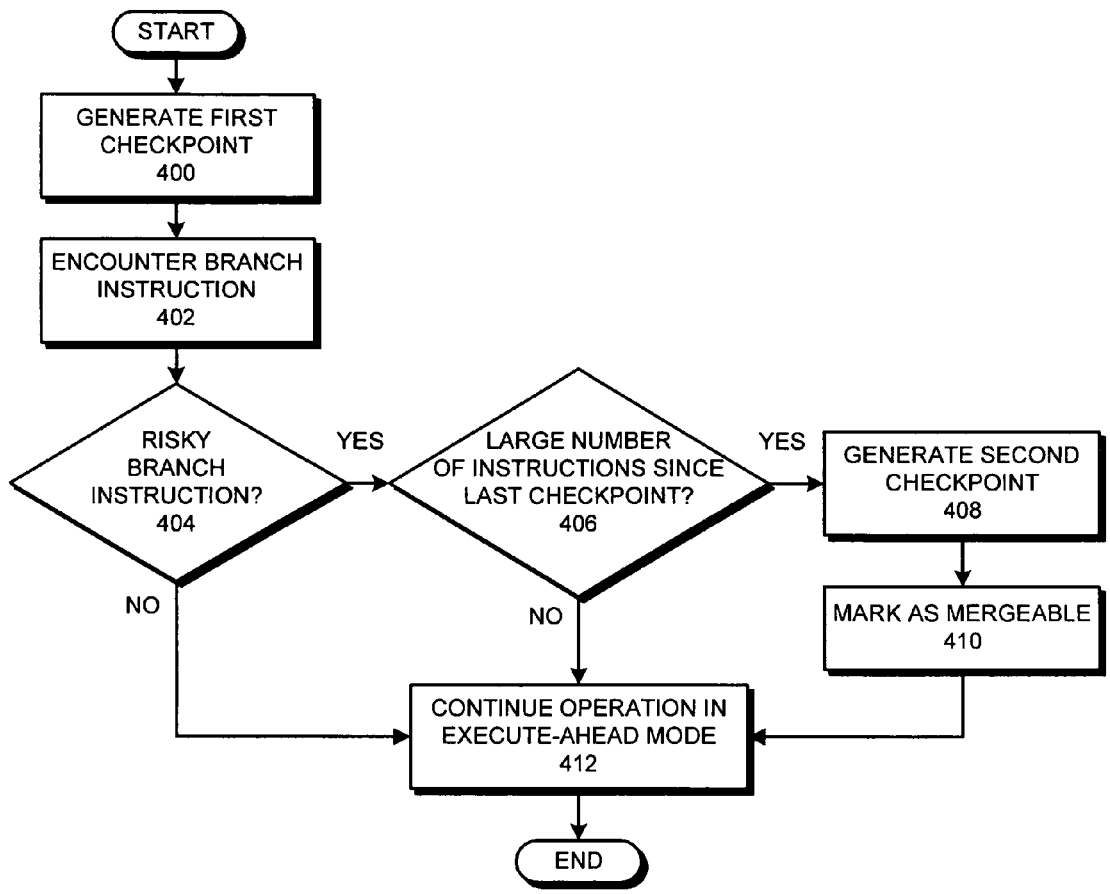
FIG. 4 presents a flow chart illustrating the process of marking a checkpoint as mergeable in accordance with an embodiment of the present invention.

FIG. 4 presents a flowchart illustrating the process of marking a branch instruction for merging in accordance with an embodiment of the present invention. The system starts by generating a checkpoint (step 400). After generating the checkpoint, the system executes instructions in execute-ahead mode 202.

The system next encounters a branch instruction (step 402). Upon encountering the branch instruction, the system determines whether the branch instruction is a "risky" branch instruction (step 404). For example, a branch instruction can be considered "risky" if the branch is data-dependent on a load miss and is weakly predicted, and thus is more likely to result in a misprediction. If the branch instruction is not risky (i.e., is strongly predicted), the system continues operation in execute-ahead mode 202 (step 412).

If the branch instruction is risky, the system determines if a large number of instructions have been executed since the last checkpoint (step 406). If not, the system does not generate a checkpoint at the risky branch instruction. In this case, there is a significant possibility of branch misprediction, but there is only a small cost associated with recovering from the misprediction. In other words, the processor can return to the earlier checkpoint in the event of a misprediction with only a small loss of computational work. The system then continues to operate in execute-ahead mode 202 (step 412).

On the other hand, if a large number of instructions have been executed since the last checkpoint, there is a large cost associated with recovering from a misprediction. Therefore, the system generates a second checkpoint at the risky branch instruction (step 408).

Because generating a checkpoint is optional for branch instructions, the system marks the checkpoint as mergeable (step 410). The system then continues to operate in execute-ahead mode 202 (step 412).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for merging checkpoints on a processor, comprising:
   executing instructions speculatively during a speculative-execution episode;
   generating a first checkpoint and a second checkpoint during the speculative-execution episode, wherein the second checkpoint is generated after the first checkpoint, and wherein the first checkpoint and the second checkpoint store separate architectural states of the processor;
   wherein generating each of the first checkpoint and the second checkpoint comprises:
      determining that the checkpoint is mergeable based on a category of the checkpoint, and
      marking the checkpoint as mergeable; and
   merging the first checkpoint with the second checkpoint during the speculative-execution episode to create a single replacement checkpoint that includes a combined architectural state generated by combining an architectural state stored in the first checkpoint with an architectural state stored in the second checkpoint;

wherein merging the first and second checkpoints comprises combining both the data stored in register file copies associated with the checkpoints and not-there bits corresponding to the register file copies so that the most recently written data and not-there bits are retained in the replacement checkpoint.

2. The method of claim 1, wherein during the speculative-execution episode, the processor operates in either:
   an execute-ahead mode, wherein instructions that cannot be executed because of an unresolved data dependency are deferred, and wherein other non-deferred instructions are executed in program order; or
   a deferred mode wherein deferred instructions are executed in program order, and wherein deferred instructions that still cannot be executed because of unresolved data dependencies are deferred again.

3. The method of claim 2, wherein generating a checkpoint involves saving architectural state information from the processor to facilitate subsequent recovery from exceptions that arise during execute-ahead mode or deferred mode.

4. The method of claim 1, wherein a checkpoint is generated when the processor encounters:
   an independent load miss;
   an unresolvable data-dependent predicted branch;
   a memory barrier instruction; or
   an atomic instruction.

5. An apparatus for merging checkpoints, comprising:
   a processor;
   a speculative-execution mechanism in the processor that is configured to execute instructions speculatively during a speculative-execution episode;
   a checkpoint generation mechanism in the processor that is configured to generate a first checkpoint and a second checkpoint during the speculative-execution episode, wherein the second checkpoint is generated after the first checkpoint, and wherein the first checkpoint and the second checkpoint store separate architectural states of the processor;
   wherein the checkpoint generation mechanism is further configured to, when generating each of the first checkpoint and the second checkpoint, determine that the checkpoint is mergeable based on a category of the checkpoint and mark the checkpoint as mergeable; and
   a merging mechanism in the processor that is configured to merge the first checkpoint with the second checkpoint during the speculative-execution episode to create a single replacement checkpoint that includes a combined architectural state generated by combining an architectural state stored in the first checkpoint with an architectural state stored in the second checkpoint;
   wherein when merging the first and second checkpoints, the merging mechanism is configured to combine both the data stored in register file copies associated with the checkpoints and not-there bits corresponding to the register file copies so that the most recently written data and not-there bits are retained in the replacement checkpoint.

6. The apparatus of claim 5, wherein the speculative-execution mechanism is configured to operate in either:
   an execute-ahead mode, wherein instructions that cannot be executed because of an unresolved data dependency are deferred, and wherein other non-deferred instructions are executed in program order; or
   a deferred mode wherein deferred instructions are executed in program order, and wherein deferred instructions that still cannot be executed because of unresolved data dependencies are deferred again.

7. The apparatus of claim 6, wherein the checkpoint generation mechanism is configured to generate a checkpoint by saving architectural state information from the processor to facilitate subsequent recovery from exceptions that arise during execute-ahead mode or deferred mode.

8. The apparatus of claim 5, wherein the checkpoint generation mechanism is configured to generate a checkpoint when the processor encounters:
   an independent load miss;
   an unresolvable data-dependent predicted branch;
   a memory barrier instruction; or
   an atomic instruction.

9. A computer system for merging checkpoints, comprising:
   a processor;
   a memory coupled to the processor, wherein the memory stores instructions and data for the processor;
   a speculative-execution mechanism in the processor that is configured to execute instructions speculatively during a speculative-execution episode;
   a checkpoint generation mechanism in the processor that is configured to generate a first checkpoint and a second checkpoint during the speculative-execution episode, wherein the second checkpoint is generated after the first checkpoint, and wherein the first checkpoint and the second checkpoint store separate architectural states of the processor;
   wherein the checkpoint generation mechanism is further configured to, when generating each of the first checkpoint and the second checkpoint, determine that the checkpoint is mergeable based on a category of the checkpoint and mark the checkpoint as mergeable; and
   a merging mechanism in the processor that is configured to merge the first checkpoint with the second checkpoint during the speculative-execution episode to create a single replacement checkpoint that includes a combined architectural state generated by combining an architectural state stored in the first checkpoint with an architectural state stored in the second checkpoint; wherein when merging the first and second checkpoints, the merging mechanism is configured to combine both the data stored in register file copies associated with the checkpoints and not-there bits corresponding to the register file copies so that the most recently written data and not-there bits are retained in the replacement checkpoint.

10. The computer system of claim 9, wherein the speculative-execution mechanism is configured to operate in either:
   an execute-ahead mode, wherein instructions that cannot be executed because of an unresolved data dependency are deferred, and wherein other non-deferred instructions are executed in program order; or
   a deferred mode wherein deferred instructions are executed in program order, and wherein deferred instructions that still cannot be executed because of unresolved data dependencies are deferred again.

11. The computer system of claim 10, wherein the checkpoint generation mechanism is configured to generate a checkpoint by saving architectural state information from the processor to facilitate subsequent recovery from exceptions that arise during execute-ahead mode or deferred mode.

12. The computer system of claim 9, the checkpoint generation mechanism is configured to generate a checkpoint when the processor encounters:
   an independent load miss;
   an unresolvable data-dependent predicted branch;
   a memory barrier instruction; or
   an atomic instruction.

13. The method of claim 1, wherein the replacement checkpoint replaces the first checkpoint and the second checkpoint.

14. The method of claim 1, wherein the method further comprises freeing up the first checkpoint to be used to store a subsequent architectural state of the processor.

15. The apparatus of claim 5, wherein following the merging operation, the merging mechanism is configured to free up the first checkpoint to be used to store a subsequent architectural state of the processor.

16. The computer system of claim 9, wherein following the merging operation, the merging mechanism is configured to free up the first checkpoint to be used to store a subsequent architectural state of the processor.

17. The method of claim 1, further comprising:
- determining if the first and second checkpoints are marked as mergeable;
- wherein merging the first checkpoint with the second checkpoint involves merging the first and second checkpoints only if the first and second checkpoints are marked as mergeable; and
- wherein, if a checkpoint is generated for a branch instruction, the checkpoint is always marked as mergeable.

* * * * *